United States Patent [19]

Pigott et al.

[11] Patent Number: 4,843,976
[45] Date of Patent: Jul. 4, 1989

[54] PLASTIC PALLET

[76] Inventors: Maurice J. Pigott, 549 Cherry St., Winnetka, Ill. 60093; Peter S. Pigott, 803 Elmwood Ave.; Brandon L. Pigott, 1017 Elmwood Ave., both of Wilmette, Ill. 60091; Schuyler F. Pigott, 1122 N. Patton, Arlington Heights, Ill. 60004

[21] Appl. No.: 230,025

[22] Filed: Aug. 9, 1988

[51] Int. Cl.[4] .......................................... B65D 19/12
[52] U.S. Cl. ................................. 108/56.1; 108/56.3; 108/901; 24/453
[58] Field of Search ................... 108/51.1, 56.1, 56.5, 108/901, 902; 24/453, 297, 287

[56] References Cited

U.S. PATENT DOCUMENTS

| 2,691,499 | 10/1954 | Watts | 248/120 |
|---|---|---|---|
| 2,916,239 | 12/1959 | Stopps | 248/120 |
| 2,918,241 | 2/1959 | Maher | 108/56.3 |
| 3,123,020 | 3/1964 | Voissem | 108/51 |
| 3,316,861 | 5/1967 | Dailey | 108/51 |
| 3,407,758 | 10/1968 | Simkins | 108/56.3 |
| 3,438,342 | 4/1969 | Woolworth et al. | 108/51 |
| 3,610,173 | 10/1971 | McIlwraith et al. | 108/57 |
| 3,664,272 | 5/1972 | Sanders | 108/53 |
| 3,667,403 | 6/1972 | Angelbeck | 108/901 |
| 3,683,821 | 8/1972 | Mangold | 108/901 |
| 3,691,964 | 9/1972 | Larson et al. | 108/51 |
| 3,717,396 | 2/1973 | Dupree | 108/901 |
| 3,804,032 | 4/1974 | Baucom | 108/51 |
| 3,814,031 | 6/1974 | Fowler | 108/51 |
| 3,835,791 | 9/1974 | Brown | 108/51 |
| 3,915,099 | 10/1975 | Wies et al. | 108/56 |
| 3,994,241 | 11/1976 | Evans | 108/53.5 |
| 4,013,021 | 3/1977 | Steinlein et al. | 108/51.1 |
| 4,128,253 | 12/1978 | Powers | 280/79.1 A |
| 4,159,592 | 7/1979 | Gabriel | 24/287 |
| 4,267,781 | 5/1981 | Powers | 108/56.1 |
| 4,316,419 | 2/1982 | Cupido | 108/56.1 |
| 4,430,776 | 2/1984 | Shimizu et al. | 24/287 |
| 4,475,703 | 10/1984 | Nordgren | 248/188.1 |
| 4,482,051 | 11/1984 | Cantey, Jr. | 206/392 |
| 4,597,338 | 7/1986 | Kreeger | 108/51.1 |
| 4,604,014 | 8/1986 | Frano | 411/338 |
| 4,635,562 | 1/1987 | Kreeger | 108/55.1 |
| 4,664,260 | 5/1987 | Stokes | 206/386 |
| 4,671,188 | 6/1987 | Betro | 108/56.3 |
| 4,674,910 | 6/1987 | Hayashi | 24/297 |
| 4,681,288 | 7/1987 | Nakamura | 24/453 |
| 4,697,699 | 10/1987 | Schneider | 206/44.11 |
| 4,706,576 | 11/1987 | James | 108/111 |
| 4,735,154 | 4/1988 | Hemery | 108/56.1 |
| 4,786,225 | 11/1988 | Poe et al. | 24/453 |

FOREIGN PATENT DOCUMENTS

| 2101346 | 3/1972 | France | 108/902 |
|---|---|---|---|
| 1310898 | 3/1975 | United Kingdom | 108/902 |

Primary Examiner—Francis K. Zugel
Attorney, Agent, or Firm—Wallenstein Wagner & Hattis, Ltd.

[57] ABSTRACT

A plastic pallet includes two identical decks that are interconnected by identical connectors. Each connector includes a central core and a surrounding sleeve interconnected by spokes. The core has flexible tangs that extend beyond opposite ends of the sleeve and lock onto the deck.

14 Claims, 2 Drawing Sheets

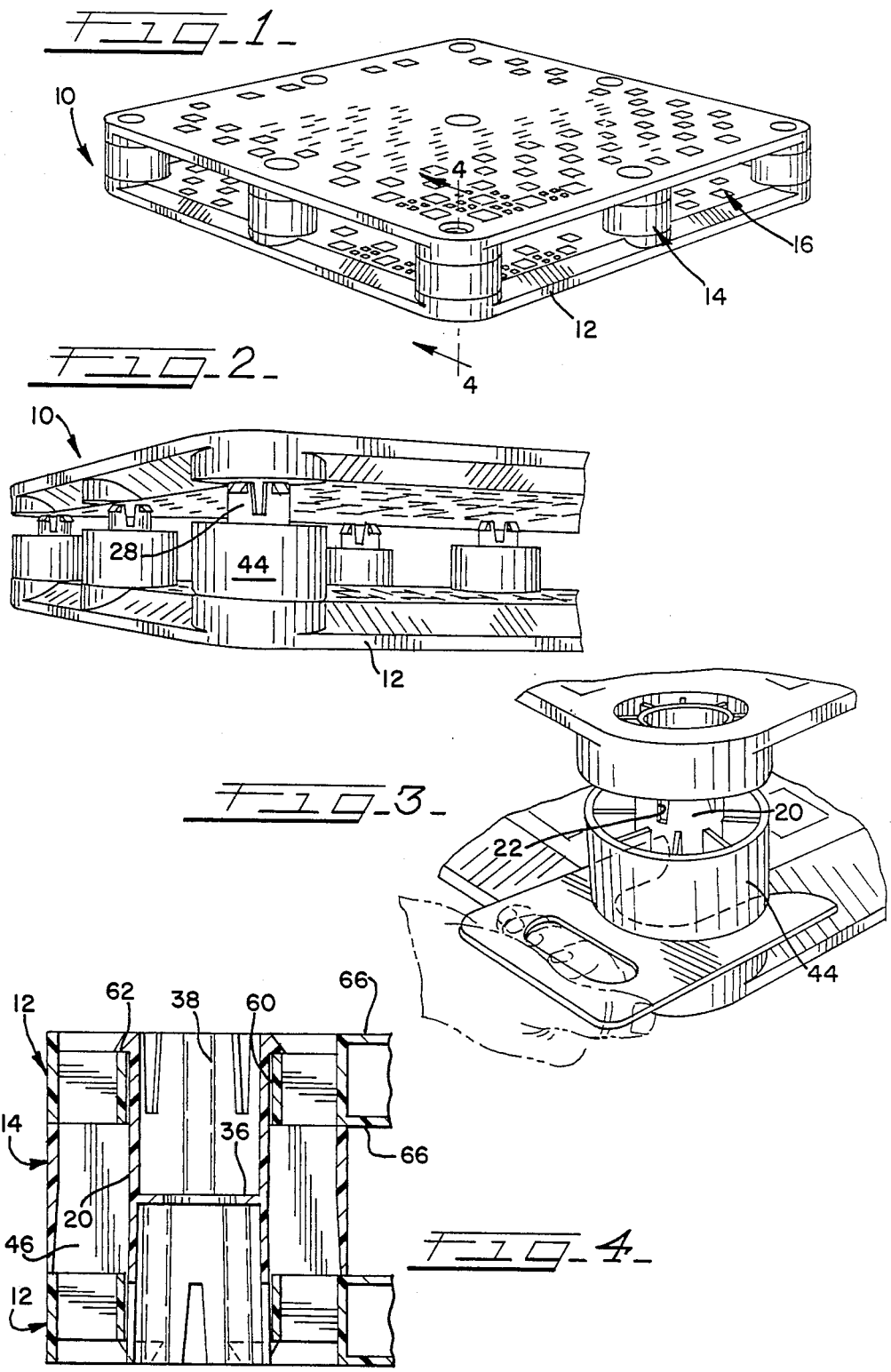

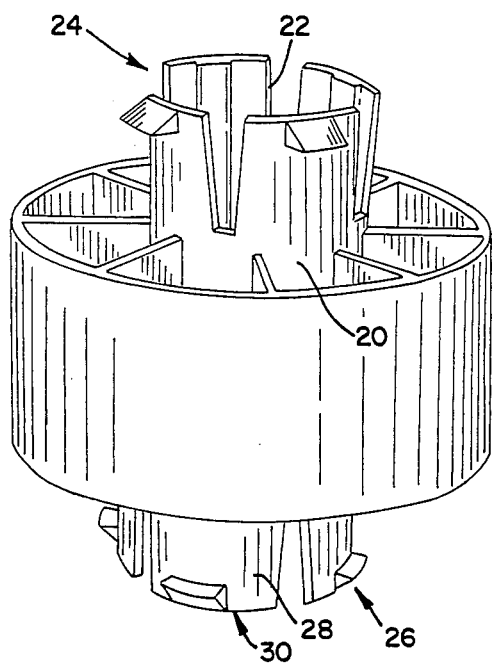
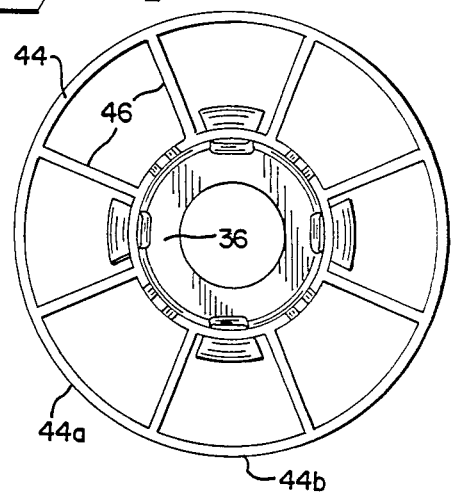
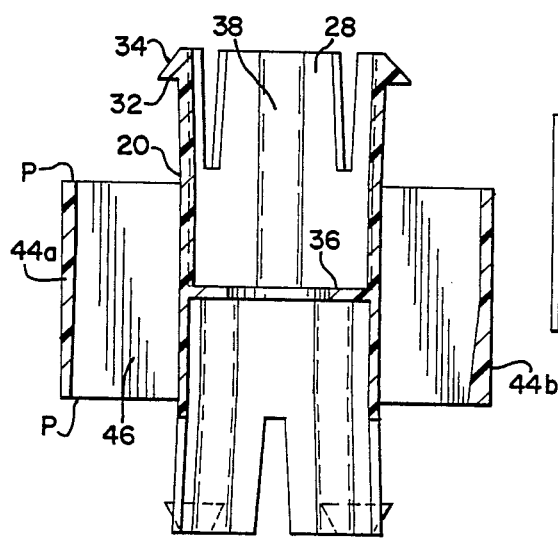
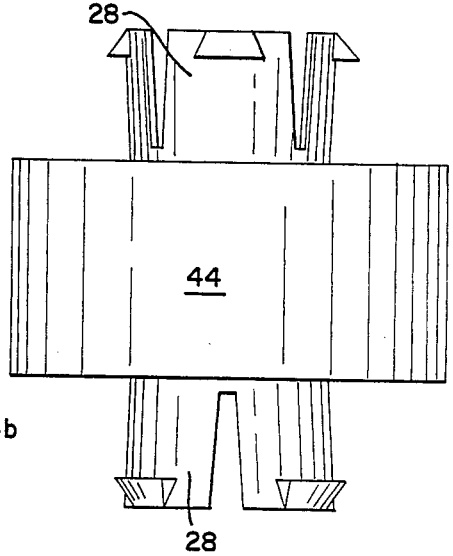

4,843,976

PLASTIC PALLET

TECHNICAL FIELD

The present invention relates generally to pallets useful in material handling and more particularly molded plastic pallets designed for use with forklift equipment.

BACKGROUND ART

For a number of years, wooden pallets have been the mainstay of the material handling business. In the past, wooden pallets have provided advantages of economy, simplicity and durability, principally because of the lack of other suitable materials. However, wooden pallets are extremely heavy and require costly hand labor in their fabrication.

In the past decades, disposable pallets have been proposed and with the growth of the plastics industry, a wide variety of plastics have been investigated to determine their suitability for use in producing pallets. Plastic pallets can easily be molded and are stronger and lighter in weight than wooden pallets. Furthermore, plastic pallets are more durable than wooden pallets.

Examples of molded plastic pallets are disclosed in U.S. Pat. Nos. 3,814,031; 3,664,271; 3,610,173; 4,013,021; 4,316,419; 4,597,338; and 4,735,154.

Thus, while a number of plastic pallets have been proposed, these proposed solutions have not been widely accepted and there remains a need for a plastic pallet that is light in weight, durable, capable of supporting heavy loads and is easy to manufacture and have a minimum number of parts that are preferably interchangeable.

SUMMARY OF THE INVENTION

According to the present invention, a plastic pallet has been developed which includes a pair of identical frame members or decks that are interconnected by specially designed connectors and can be assembled without the need for any specially designed tools. The plastic pallet is designed such that the connectors can be snap fitted onto the frame members.

More specifically, the frame members or decks have openings which define surrounding abutments that are recessed below the exposed surface and the connectors have flexible tangs that have barbs which engage the abutments.

Each connector consists of a hollow circular core which has slots extending from opposite ends to produce first and second sets of tangs. Spokes are integral with the peripheral surface of the core between the tangs and a sleeve is integral with the outer ends of the spokes. According to one aspect of the invention, the sleeve has tapered portions between each pair of spokes and alternating tapered portions are reversely tapered to provide additional rigidity for the connectors. Additionally, the core has a force absorbing inner flange equally spaced from the respective tangs.

Each tang has a tapered barb adjacent a free end and a aligned inner integral rib which extends to the flange so that forces transmitted to the tangs are directed toward the flange.

According to one further aspect of the invention, a separator tool has been developed that can be used to separate the connectors from the deck. The separator tool consists of a main body that is tapered from one end toward the opposite end and has a slot extending from the narrower end and the slot has a width that is greater than the width or diameter of the core. The separator tool is forced between the surface of the deck and a plane defined by the sleeve and the spokes to flex the tangs and release the connector from the deck or frame.

BRIEF DESCRIPTION OF DRAWINGS

FIG. 1 is a perspective view of the plastic pallet constructed in accordance with the teachings of present invention;

FIG. 2 is a partial perspective view showing the pallet in a partially assembled condition;

FIG. 3 is a partial perspective view showing the separator tool being used to separate a connector from a deck;

FIG. 4 is a cross-sectional view, as viewed along line 4—4 of FIG. 1;

FIG. 5 is a top perspective view of the connector;

FIG. 6 is a top plan view of the connector;

FIG. 7 is a side view of the connector; and

FIG. 8 is a cross-sectional view of the connector.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

FIG. 1 of the drawings shows a plastic pallet, generally designated by reference numeral 10, and includes a pair of identical rectangular decks or frame members 12 that are interconnected by a plurality of connectors 14. In the illustrated embodiment, nine connectors are shown, which are positioned at the four corners of the frame members and between each of the corners as well as in the center of the frame members. The connector are positioned so that forklift tine receiving openings 16 are formed between the connectors.

The details of the connectors are illustrated in FIGS. 5-8. As illustrated therein, each connector 14 includes a hollow central circular core 20 that has circumferentially spaced slots 22 extending from opposite ends thereof which produce first and second sets of tangs 24 and 26. Each tang 28 is identical in construction and has a barb 30 formed adjacent a free end thereof. Each barb 30 has a flat lower surface 32 which extends perpendicular to the axis of the core and has a tapered surface 34 extending from the outer edge to define a ramp.

In the illustrated embodiment, four tangs are shown for each set with each tang spanning approximately ninety degrees. It should be noted that the tangs of the respective sets are circumferentially offset so that the slots forming one set of tangs are axially aligned with the centers of the opposite set of tangs.

The central core also has a force absorbing flange 36 located at the center of the core and equally spaced from opposite ends. In addition, each tang has an inner integral reinforcing rib 38 which extends from the flange to the free end and is aligned with the barb 30. Thus, forces applied to the tangs are transmitted by the ribs 38 to the flange 36 where they are dissipated.

The connector also includes a large circular sleeve 44 that surrounds the core and is connected thereto by radially extending spokes 46. The upper and lower edges of the spokes and the sleeve define planes P which extend perpendicular to the axis of the core for a purpose to be described later.

According to one aspect of the invention, the sleeve is configured to absorb large forces without being destructed. Thus, the sleeve has portions 44a and 44b, which are respectively located between alternating pairs of spokes. The sleeve portions 44a and 44b are tapered from one edge to the opposite edge. However, sleeve portion 44a has its thickest portion adjacent the upper edge of the sleeve, as viewed in FIG. 8, while sleeve portion 44b has its thickest portion adjacent a lower edge of the sleeve. Stated another way, the sleeve portions have alternating reverse tapers to increase the strength thereof.

As clearly shown in FIG. 4, each deck or frame member 12 has openings 60 which are adapted to receive tangs 28 and the openings are surrounded by abutments 62 that are recessed below the adjacent surface 66 of the deck means. The abutment is spaced from the opposite surface 68 by a dimension equal to the spacing between plane P and the surface 32 of barb 30 so that the barbs will snap into position, as will be described later.

To assemble the plastic pallet, the connectors are first assembled to one deck by aligning a set of tangs 24 or 26 with an opening 60 and then applying an axial force which causes the ramps 34 of the barbs to deflect the tang inwardly sufficient to allow the set of tangs to pass through the openings. After the barb 30 has cleared the abutment surface 62, the memory characteristics of the plastic will snap the tangs back to their original condition and lock the connector to the frame member 12. After all of the connectors are assembled on one deck, the second deck is positioned as shown in FIG. 2 and a force is applied to the top surface to complete the assembly of the plastic pallet.

In the assembled condition illustrated in FIG. 1, the adjacent connectors will provide an open space for the reception of the tine of a forklift truck (not shown) and the round surfaces of the connector sleeves will tend to guide the tine into the space 16.

It will be appreciated that the simplicity of the plastic pallet reduces the inventory substantially since only two components are necessary. Also, since the frame member or deck only requires recessed shoulders formed in wells, the molds for producing the large decks are greatly simplified which reduces the production costs.

The intricate design of the connectors has several distinct advantages. The design is such that all external forces are transmitted to the center of the core which will withstand the greatest force without destruction. Furthermore, the connectors are configured so that they are formed as one piece in a single stage mold to reduce the cost. Since the connectors and the decks are preferably injection molded from recycled plastic, the costs are further reduced.

Another significant advantage of the plastic pallet is that the connectors can easily be separated should one the connectors become damaged. This can be accomplished by the owner without return of the pallet assembly to the manufacturer.

According to a further aspect of the invention, a simple tool has been developed that can be used to separate the connector from the deck. As illustrated in FIG. 3, the tool 80 consists of a main body that has a progressively increasing taper from one end to the opposite end thereof. A slot 82 extends from the pointed end of the main body. The slot has a width that is greater than the diameter of the core 20. The main body also has an opening 84 for gripping.

In use, the tool is positioned as shown in FIG. 3 and a force is applied to the end to wedge the tool between the plane P of the connector and the adjacent surface of the deck. With sufficient force, the tangs will be deflected inwardly sufficiently to clear the edge of the abutment and allow the connector to be separated from the deck.

The advantages of the tool are apparent. The tool is easy to fabricate at a minimum cost and can be supplied with each pallet order at minimal additional cost. Thereafter, the owner can easily replace defective connectors without discarding any usable components of the pallet.

As indicated above, the pallet components are preferably injection molded from recycled material, such as polypropylene or similar thermoplastic material. Additionally, a pigment may be added to provide color combinations to suit the customer's needs.

Of course, the size and shape and the number of connectors can be varied without departing from the spirit of the invention. Also, while identical decks have been shown and described, the decks could have different shapes or configurations.

While the specific embodiments have been illustrated and described, numerous modifications come to mind without significantly departing from the spirit of the invention and the scope of protection is only limited by the scope of the accompanying claims.

We claim:

1. A load-bearing pallet comprising a pair of substantially identical frame members having a plurality of spaced openings therein which are positioned to be vertically aligned and connectors members received into said openings for interconnecting said frame members, each of said connector members including a substantially circular hollow central core member having a plurality of flexible tangs extending from opposite ends thereof and received into said openings of respective frame members to releaseably interconnect said frame members, and an inwardly-directed force-absorbing flange intermediate opposite ends of said core.

2. A load-bearing pallet as defined in claim 1, in which said frame members are substantially rectangular with connector members at least each corner of said frame members, said connector members maintaining said frame members spaced from each other to define forklift tine receiving slots.

3. A load-bearing pallet as defined in claim 1, in which each connector member has a plurality of integral spokes extending from the core between said tangs with a sleeve integral with the free ends of said spokes, said spokes and sleeve defining planes that engage adjacent surfaces of respective frame members.

4. A load-bearing pallet as defined in claim 3, in which said sleeve has tapered portions between adjacent pairs of spokes and in which alternating tapered portions are reversely tapered.

5. A load-bearing pallet as defined in claim 1, in which said core has inner longitudinal ribs extending from said flange to a free end of each of said tangs.

6. A load-bearing pallet as defined in claim 5, in which said tangs on respective ends of said core are circumferentially offset from each other and each tang has a tapered barb on an outer surface aligned with an inner rib.

7. A load-bearing pallet as defined in claim 3, in combination with a separator tool for separating said connector from said frame members, said tool comprising a main body that is tapered from substantially a point at one end with a slot extending from said one end, said slot having a width that is greater than the diameter of said core so that said tool can be forced between said plane and an adjacent surface of said frame member to apply sufficient force to flex said tangs and release said connector from said frame member.

8. A connector for use in interconnecting a pair of frame members to form a pallet, comprising a central hollow core member having slots extending from opposite ends to produce a plurality of flexible tangs at opposite ends of said core member, a plurality of spokes extending from the periphery of said core member between said tangs, a sleeve surrounding said core member and being integral with outer ends of said spokes and an inwardly-directed integral force-absorbing flange between said tangs.

9. A connector as defined in claim 8, in which said hollow core member is circular and said slots terminate in close proximity to planes defined by said spokes.

10. A connector as defined in claim 9, in which each of said tangs has a barb formed adjacent a free edge thereof, each of said barbs having a lower flat edge extending substantially parallel to said planes and being tapered toward free ends of said tangs.

11. A connector as defined in claim 9, in which said sleeve has tapered portions between each adjacent pair of spokes and in which alternating portions are reversely tapered.

12. A connector as defined in claim 10, in which said core member has integral reinforcing ribs aligned with each of said barbs.

13. A connector as defined in claim 8, in which said connector is injection molded from plastic.

14. A load-bearing pallet comprising a pair of substantially identical frame members having a plurality of spaced openings therein which are positioned to be vertically aligned and connector members received into said openings for interconnecting said frame members, each of said connector members including a substantially circular central core member having a plurality of flexible tangs extending from opposite ends thereof, each connector member having a plurality of integral spokes extending from the core between said tangs with a sleeve integral with the free ends of said spokes, said spokes and sleeve defining planes that engage adjacent surfaces of respective frame members, said sleeve having tapered portions between adjacent pairs of spokes and in which alternating tapered portions are reversely tapered, said tangs being received into said openings of respective frame members to releasably interconnect said frame members.

* * * * *